(12) United States Patent
Mak et al.

(10) Patent No.: US 12,465,629 B2
(45) Date of Patent: Nov. 11, 2025

(54) PREVENTION AND TREATMENT OF ORGAN INJURIES

(71) Applicant: Farsight Medical Technology (Shanghai) Co., Ltd., Shanghai (CN)

(72) Inventors: Ching-Pong Mak, Shanghai (CN); Fashu Ma, Shanghai (CN); Dong Xiao, Shanghai (CN); Michael Peel, Shanghai (CN); Hans Fliri, Shanghai (CN)

(73) Assignee: Farsight Medical Technology (Shanghai) Co., Ltd., Shanghai (CN)

( * ) Notice: Subject to any disclaimer, the term of this patent is extended or adjusted under 35 U.S.C. 154(b) by 582 days.

(21) Appl. No.: 17/995,992

(22) PCT Filed: Apr. 15, 2021

(86) PCT No.: PCT/CN2021/087501
§ 371 (c)(1),
(2) Date: Oct. 12, 2022

(87) PCT Pub. No.: WO2021/209003
PCT Pub. Date: Oct. 21, 2021

(65) Prior Publication Data
US 2023/0181680 A1    Jun. 15, 2023

(30) Foreign Application Priority Data

Apr. 15, 2020  (WO) ................ PCT/CN2020/084820
Mar. 18, 2021  (WO) ................ PCT/CN2021/081574

(51) Int. Cl.
*A61K 38/13* (2006.01)
*A61K 45/06* (2006.01)
*A61P 11/00* (2006.01)

(52) U.S. Cl.
CPC .............. *A61K 38/13* (2013.01); *A61K 45/06* (2013.01); *A61P 11/00* (2018.01)

(58) Field of Classification Search
CPC .......... A61K 38/13; A61K 45/06; A61P 11/00
See application file for complete search history.

(56) References Cited

U.S. PATENT DOCUMENTS

| 6,583,265 | B1 | 6/2003 | Ellmerer-Mueller et al. |
| 8,188,052 | B2 | 5/2012 | Houck |
| 2013/0303438 | A1 | 11/2013 | Su et al. |

FOREIGN PATENT DOCUMENTS

| CN | 1176826 | A | 3/1998 |
| CN | 1305493 | A | 7/2001 |
| CN | 101068829 | A | 11/2007 |
| CN | 101437501 | A | 5/2009 |
| CN | 101511357 | A | 8/2009 |
| CN | 103249424 | A | 8/2013 |
| CN | 106902346 | A | 6/2017 |
| CN | 106902347 | A | 6/2017 |
| CN | 111132688 | A | 5/2020 |
| CN | 111449050 | A | 7/2020 |
| EP | 0194972 | A2 | 9/1986 |
| EP | 0484281 | A2 | 5/1992 |
| JP | H08298986 | A | 11/1996 |
| TW | 201639873 | A | 11/2016 |
| WO | 9965933 | A1 | 12/1999 |
| WO | 2008143996 | A1 | 11/2008 |
| WO | 2010076329 | A1 | 7/2010 |
| WO | 2012075494 | A1 | 6/2012 |
| WO | 2014053834 | A1 | 4/2014 |
| WO | 2019016572 | A1 | 1/2019 |
| WO | 2021068957 | A1 | 4/2021 |
| WO | 2021190601 | A1 | 9/2021 |
| WO | 2021190603 | A1 | 9/2021 |

OTHER PUBLICATIONS

Office Action issued in Japan application No. 2022-561995, Feb. 20, 2025, 4 pages.
Written Opinion of the International Application No. PCT/CN2020/070852, Apr. 3, 2020, 8 pages.
Written Opinion of the International Application PCT/CN2020/084820, Jan. 22, 2021, 12 pages.
Written Opinion of the International Application No. PCT/CN2020/120290, Jan. 14, 2021, 7 pages.
Written Opinion of International Application No. PCT/CN2021/087501, Jul. 19, 2021, 8 pages.
Written Opinion of the International Application No. PCT/CN2019/110777, Jun. 30, 2020, 6 pages.
An, Jin , et al., "Polydeoxyribonucleotide Ameliorates Lipopolysaccharide-Induced Lung Injury by Inhibiting Apoptotic Cell Death in Rats", International Journal of Molecular Sciences, No. 18, vol. 1847,, Aug. 21, 2017, pp. 1-14.
Hou, Weiping , et al., "Cyclophilin D promotes tubular cell damage and the development of interstitial fibrosis in the obstructed kidney", Clinical and Experimental Pharmacology and Physiology, vol. 45, 2018, pp. 250-260.
Hu, Jun-Feng , et al., "The effect of cyclosporine A on lipopolysaccharide-induced acute lung injury in mice", Chinese Journal of Applied Physiology. 31, No. 1, vol. 27, Dec. 31, 2011, pp. 120-123.
Janowski, B. , et al., "A Protease-Free Assay for Peptidyl Prolyl cis/trans Isomerases Using Standard Peptide Substrates", Analytical Biochemistry, vol. 252, 1997, pp. 299-307.
Khalid, Usman , et al., "Kidney ischaemia reperfusion injury in the rat: the EGTI scoring system as a valid and reliable tool for histological assessment", Journal of Histology & Histopathology, vol. 3, Article 1, 2016, pp. 1-7.
Li, Wei-Hua , et al., "Pathophysiology of respiration. Pathology of Respiratory System", Peoples Military Medical Press, Mar. 31, 2011, p. 24.

(Continued)

*Primary Examiner* — Amber D Steele
(74) *Attorney, Agent, or Firm* — Synergy IP Group AG; Lily Ackerman

(57) ABSTRACT

The invention provides for Compound I or a pharmaceutically acceptable salt thereof (I) for use in the prevention and/or treatment of an organ injury, or a condition associated with an organ injury, in a subject diagnosed with, or suffering from an infection.

20 Claims, 7 Drawing Sheets

(56) References Cited

OTHER PUBLICATIONS

Liu, Yuning, et al., "Clinical Experiences of National-level Famous Old Chinese Medicine Practitioners Series: Clinical Records of Kidney Diseases", China Medical Science Press, vol. 11, Nov. 30, 2016, pp. 212-216.

Meng, Peng. Z., et al., "Protective Effect of Dexmedetomidine on Endotoxin-Induced Acute Lung Injury in Rats", Med Sci Monit, vol. 24, Jul. 14, 2018, pp. 4869-4875.

Moscoso-Solorzano, Grace, et al., "Cyclophilin A as a mediator of tissue injure and nephrotoxicity", Nephrology Reviews, vol. 4:e9, 2012, pp. 42-44.

Quesniaux, Valerie F. J, et al., "Cyclophilin binds to the region of cyclosporine involved in its immunosuppressive activity", Eur. J. Immunol. vol. 17, 1987, pp. 1359-1365.

Singh, D., et al., "Cyclosporine Protects Against Ischemia/Reperfusion Injury in Rat Kidneys", Toxicology, vol. 207, No. 3, Dec. 22, 2004, pp. 339-347.

Tang, Jian, et al., "Using Calcineurin Inhibitor in donor preconditioning reduce ischemia-reperfusion injury in rat renal transplantation and the mechanisms", China Medical Herald, vol. 9, Issue 25, Sep. 2012, pp. 8-10.

Xiao, Zhenghua, et al., "Attenuation of Lipopolysaccharide-Induced Acute Lung Injury by Cyclosporine-A via Suppression of Mitochondrial DNA", Med Sci Monit; vol. 24, Oct. 27, 2018, pp. 7682-7688.

Yanlei, Pang, et al., "Modern Practical Emergency Medicine", Jilin Science and Technology Press, vol. 1/2, Sep. 30, 2016, pp. 247-261.

Ying, Yuan, et al., "Regulation of necrotic cell death p53, PARP1 and Cyclophilin D—overlapping pathways of regulated necrosis?", Cell Mol. Life Sci., vol. 73 (11-12), 2016, pp. 2309-2324.

Zhou, Jiangqiao, et al., "Protective effect of cyclosporine A on ischemia-reperfusion injury in transplanted kidney", Chinese Journal of Organ Transplantation, vol. 26, No. 6, Jun. 30, 2005, pp. 378-379.

Extended European Search Report issued in EP21788345.3, Apr. 22, 2024, 11 pages.

Office Action issued in Japan application No. 2021-541238, Jan. 4, 2024, 5 pages.

Office Action issued in Taiwan application No. 110113545, Nov. 28, 2024, 8 pages.

Fonai, Fruzsina, et al., "Lack of cyclophilin D protects against the development of acute lung injury in endotoxemia", Biochimica et Biophysica Acta 1852, Sep. 15, 2015, pp. 2563-2573.

2B

2C

4A

4B

4C

PREVENTION AND TREATMENT OF ORGAN INJURIES

CROSS REFERENCE TO RELATED APPLICATIONS

This application is a U.S. National Stage Application filed under 35 U.S.C. § 371 claiming the benefit of International Application No. PCT/CN2021/087501, filed on Apr. 15, 2021, which claims priority to and the benefit of International Application No. PCT/CN2021/081574, filed on Mar. 18, 2021, and International Application No. PCT/CN2020/084820, filed on Apr. 15, 2020, all of which are hereby incorporated herein by reference in their entireties.

BACKGROUND OF THE INVENTION

Infectious diseases caused by pathogens including viruses, bacteria, fungi, and parasites are ranked as the second leading cause of death worldwide by the World Health Organization. Infection by such pathogens can cause an innate immune response characterized by the stimulation of monocytes and release of pro-inflammatory cytokines and the activation of a medley of different immune pathways. Toll-like receptors (TLRs) play a key role in this initial immune activation. The activation of TLRs induces an inflammatory response to control the infection. However, many of the same components of inflammation that are beneficial in the host defense against infection, can be deleterious, causing cell and tissue damage, and hence, single or multiple organ failure. Thus there is also a need for an effective pharmacological therapy or approach to treat or prevent tissue or organ damage, arising from over-active immune response mechanism which is triggered by infection, and infectious disease.

For example, Cyclosporin A (CsA) has been suggested, in preliminary studies to have a protective effect on lipopolysaccharide (LPS) induced lung injury in mice (see Hu, Jun-feng et al, Chinese Journal of Applied Physiology, 2011 (27), abstract). Cyclosporin however also has immunosuppressive activity, and thus may not be compatible for all patients, and is additionally poorly water soluble, and as such challenging to formulate.

U.S. Pat. No. 6,583,265 discloses Compound I:

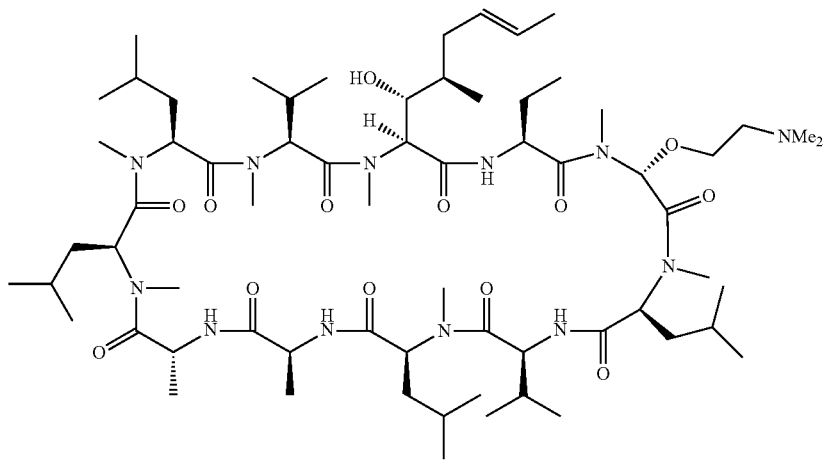

Compound 1

This compound is featured in Example 27 in the patent U.S. Pat. No. 6,583,265, which includes many hundreds of named compounds having modifications at various positions around the ring. However no biological testing data or particular uses are described for this compound or related analogues.

Compound I is also disclosed in WO2019/0169572, for use in the treatment or prevention of acute or chronic inflammatory disorders such as acute kidney injury, ischaemia-reperfusion injury, or chronic or acute pancreatitis. WO2019/0169572 describes a model study for acute kidney injury in mice, but does not disclose the use of Compound I in the prevention or treatment of an infection-related organ injury or a condition associated therewith such as injury to the lung caused by an infection.

It is an object of the present disclosure and invention to provide for an effective prophylaxis, and/or treatment of an organ injury, or a condition associated therewith in a subject diagnosed with, or suffering from an infection, in particular to a method for preventing or treating injuries to the lung or lung tissue, which may be associated with an infection.

Further objects of the invention will be clear on the basis of the following description of the invention, examples and claims.

SUMMARY OF THE INVENTION

In a first aspect, the present disclosure relates to Compound I or a pharmaceutically acceptable salt thereof

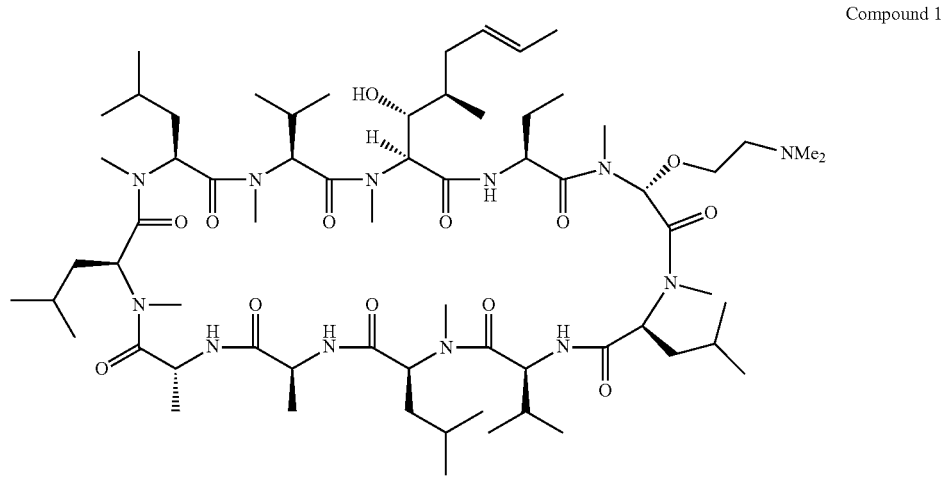 [SMILES: C/C=C/C[C@@H](C)[C@@H](O)[C@H]1C(=O)N[C@@H](CC)C(=O)N(C)[C@H](OCCN(C)C)C(=O)N(C)[C@@H](CC(C)C)C(=O)N[C@@H](C(C)C)C(=O)N(C)[C@@H](CC(C)C)C(=O)N[C@@H](C)C(=O)N[C@H](C)C(=O)N(C)[C@@H](CC(C)C)C(=O)N(C)[C@@H](CC(C)C)C(=O)N(C)[C@@H](C(C)C)C(=O)N1C]

Compound 1 for use in the prevention, and/or treatment of an organ injury or a condition associated with an organ injury in a subject diagnosed with, or suffering from an infection. In a related aspect, the present disclosure relates to Compound I, or a pharmaceutically acceptable salt thereof for use in the prevention, and/or treatment of an organ injury, or a condition associated with an organ injury in a subject diagnosed with, or suffering from an infection, wherein the organ is the lung. In yet another related aspect, the disclosure relates to the use of Compound for use in preventing (e.g. the progression) of a lung injury or a condition associated therewith in a subject diagnosed with, or suffering from a respiratory infection.

DESCRIPTION OF THE DRAWINGS

FIG. 1A depicts tidal volume (mL), FIG. 1B depicts respiratory breath rate (breaths/min), FIG. 1C depicts peak inspiratory flow rate (mL/s), and FIG. 1D depicts the peak expiratory flow rate (mL/s).

The study groups G1 to G6 as indicated in these figures correspond to the following: G1—sham (no LPS induction), G2—model (LPS induction, no drug treatment); G3—positive control (3 mg/kg dexamethasone), G4—1 mg/kg Compound I, G5—5 mg/kg Compound I, and G6—10 mg/kg Compound I). The notation featured in FIGS. 1A, 1B, 1C, and 1D correspond to variance analysis results (T-test) as follows: #$p<0.05$ vs. sham; *$p<0.05$ vs. model, **$p<0.01$ vs. model.

Figure 2:
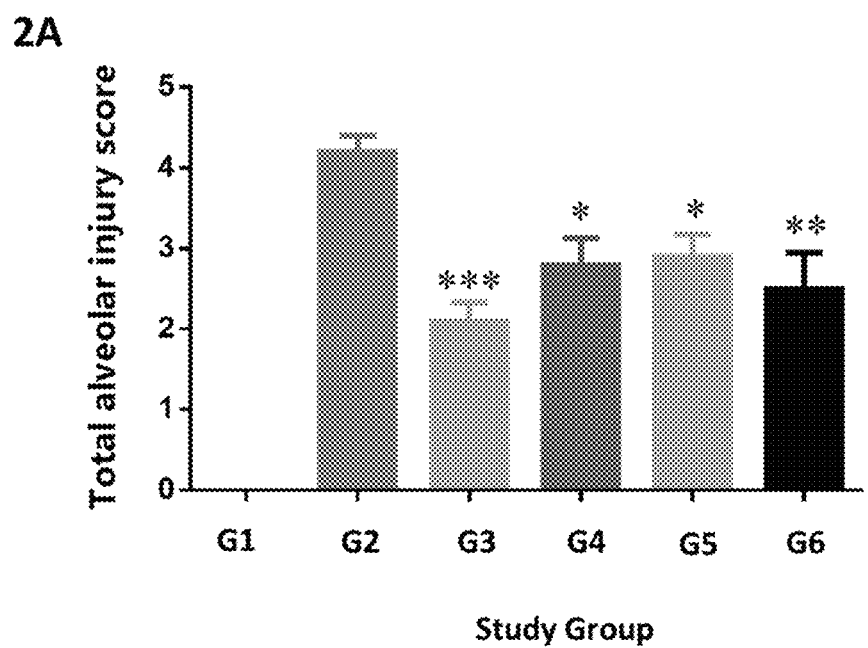
Figure 2:
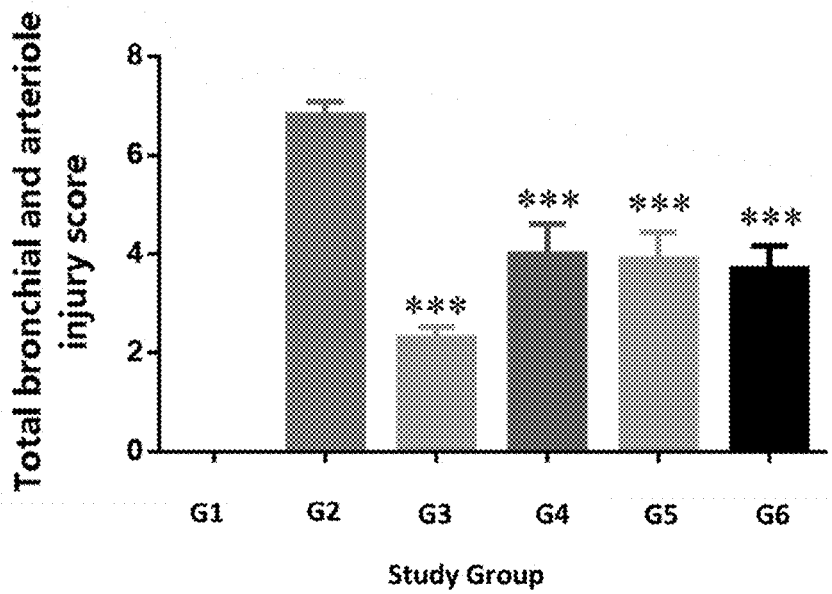
Figure 2:
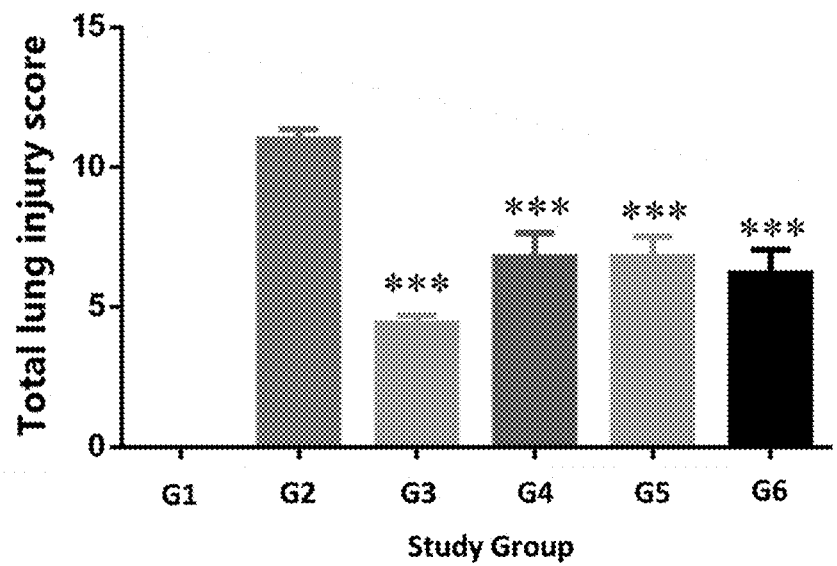

FIG. 2 depicts the histopathological results and analysis of lung injury of the model study described in Example 1. FIG. 2A depicts the scoring based on total alveolar injury, FIG. 2B depicts scoring based on total bronchial and arteriole injury scoring, and FIG. 2C depicts scoring based on total lung injury.

The study groups G1 to G6 indicated in these figures correspond to the following: G1—sham (no LPS induction), G2—model (LPS induction, no drug treatment); G3—positive control (3 mg/kg dexamethasone), G4—1 mg/kg Compound I, G5—5 mg/kg Compound I, and G6—10 mg/kg Compound I. The notation (asterisks) featured in FIGS. 2A, 2B, and 2C correspond to variance analysis results (one way ANOVA) as follows: *$p<0.05$ vs. model, $p<0.01$ vs. model, *$p<0.001$ vs. model.

Figure 3:
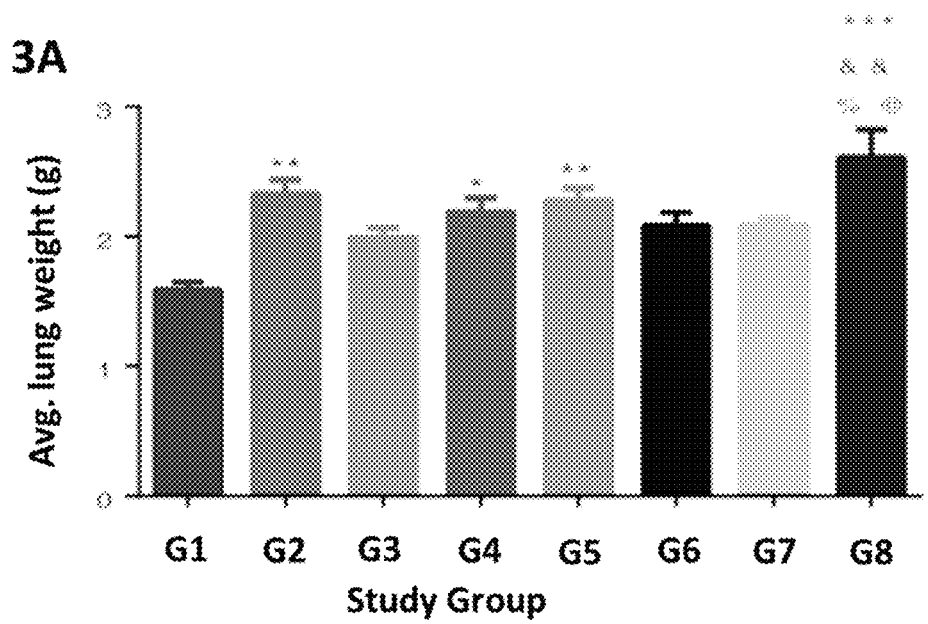
Figure 3:
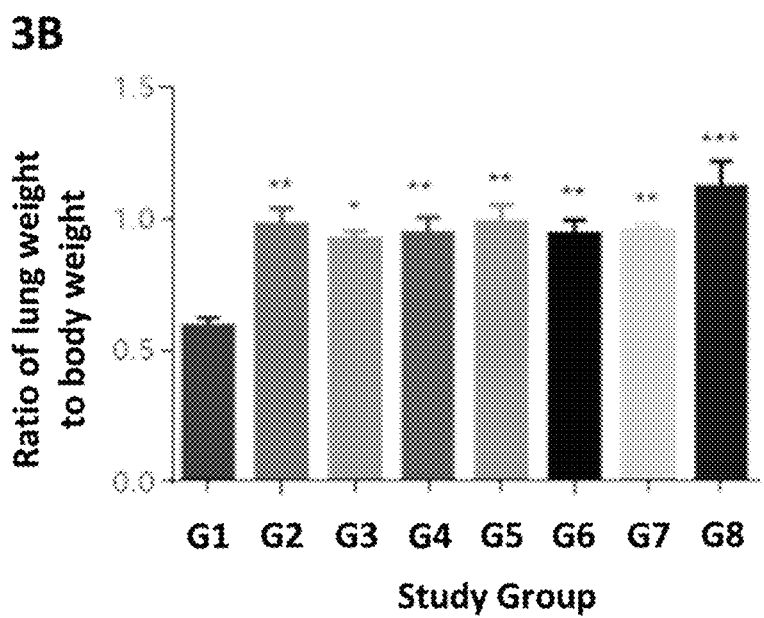

FIG. 3 depicts the body and lung weight measurement results obtained at the end of the study described in Example 2. FIG. 3A depicts lung weight at end of study (notation in Figure corresponds to variance analysis results (one way ANOVA) as follows: *$p<0.05$ vs. sham, $p<0.01$ vs. sham, *$p<0.001$ vs. sham, &&$p<0.05$ vs. G3, % $p<0.05$ vs G6, @$p<G7$). FIG. 3B depicts ratio of lung weight to body weight at end of study (notation in Figure corresponds to variance analysis results (one way ANOVA) as follows: *$p<0.05$ vs sham, $p<0.01$ vs sham, *$p<0.001$ vs sham.

Figure 4:
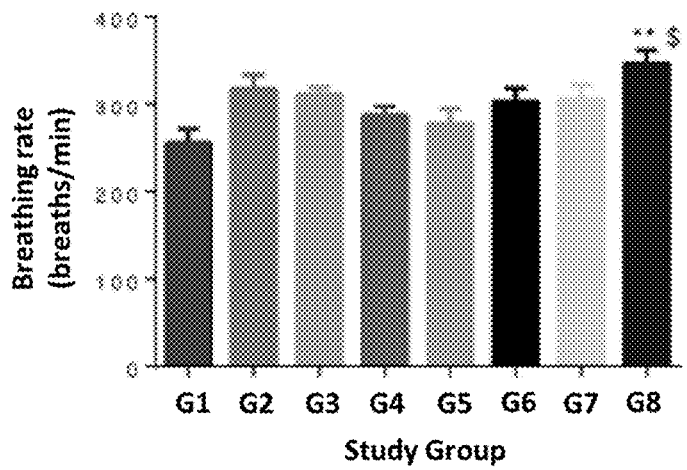
Figure 4:
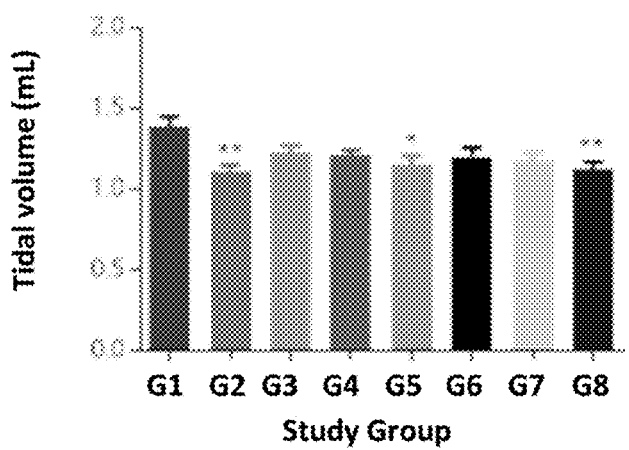
Figure 4:
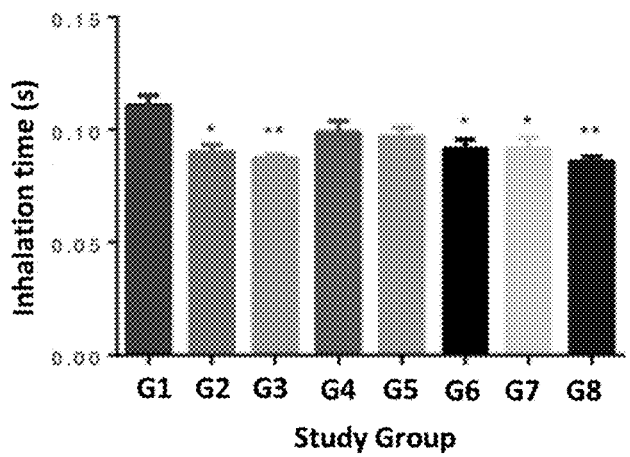
Figure 4:
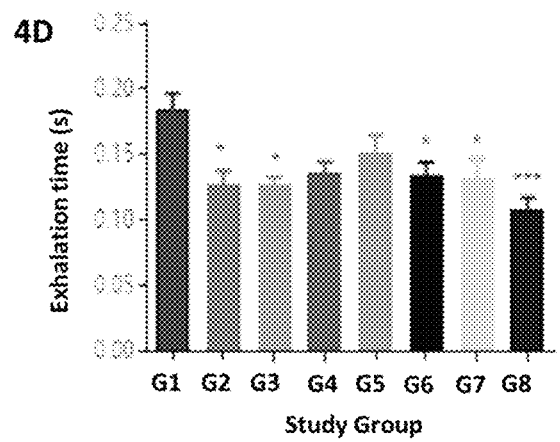

FIG. 4 depicts the pulmonary lung test results obtained at the end of the study described in Example 2. FIG. 4A depicts respiratory breath rate (breaths/min; notation in Figure corresponds to variance analysis results (one way ANOVA) as follows: **$p<0.01$ vs. sham, $$p<0.05$ vs. G5), FIG. 4B depicts tidal volume (mL; notation in Figure corresponds to variance analysis results (one way ANOVA) as follows: *$p<0.05$ vs. sham, $p<0.01$ vs. sham), FIG. 4C depicts inhalation time (mL/s; notation in Figure corresponds to variance analysis results (one way ANOVA) as follows: $p<0.05$ vs. sham, **$p<0.01$ vs. sham), and FIG. 4D depicts exhalation time (mL/s; notation corresponds to variance analysis results (one way ANOVA) *$p<0.05$ vs. sham, ***$p<0.001$ vs sham).

Figure 5:
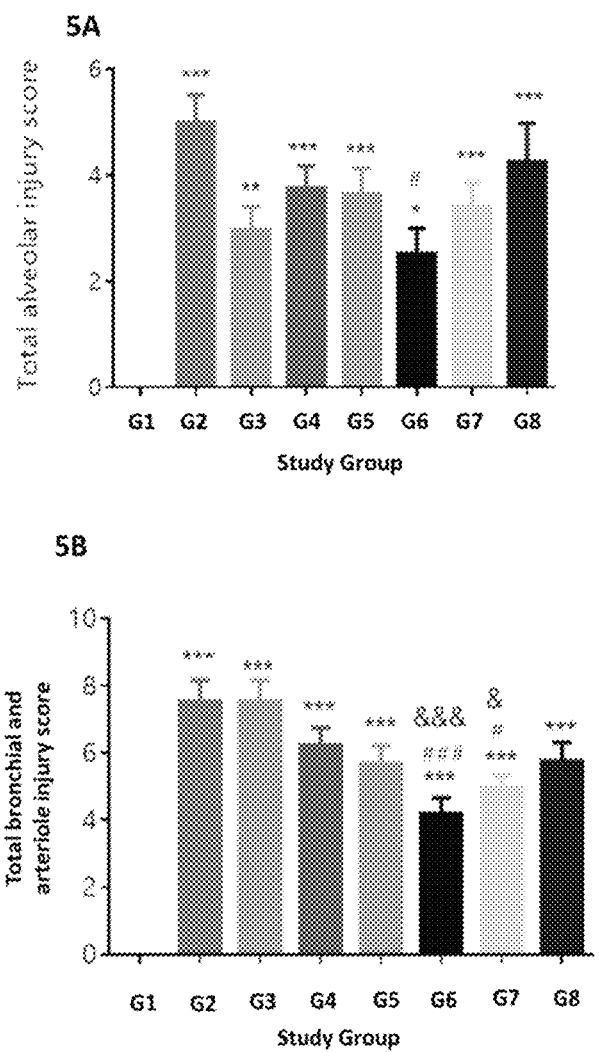
Figure 5:
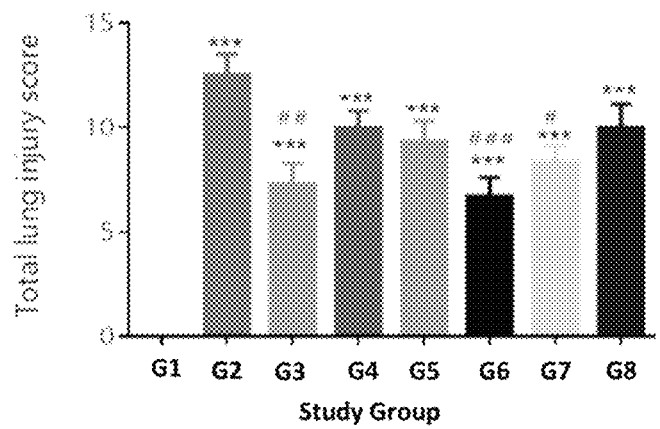
Figure 5:
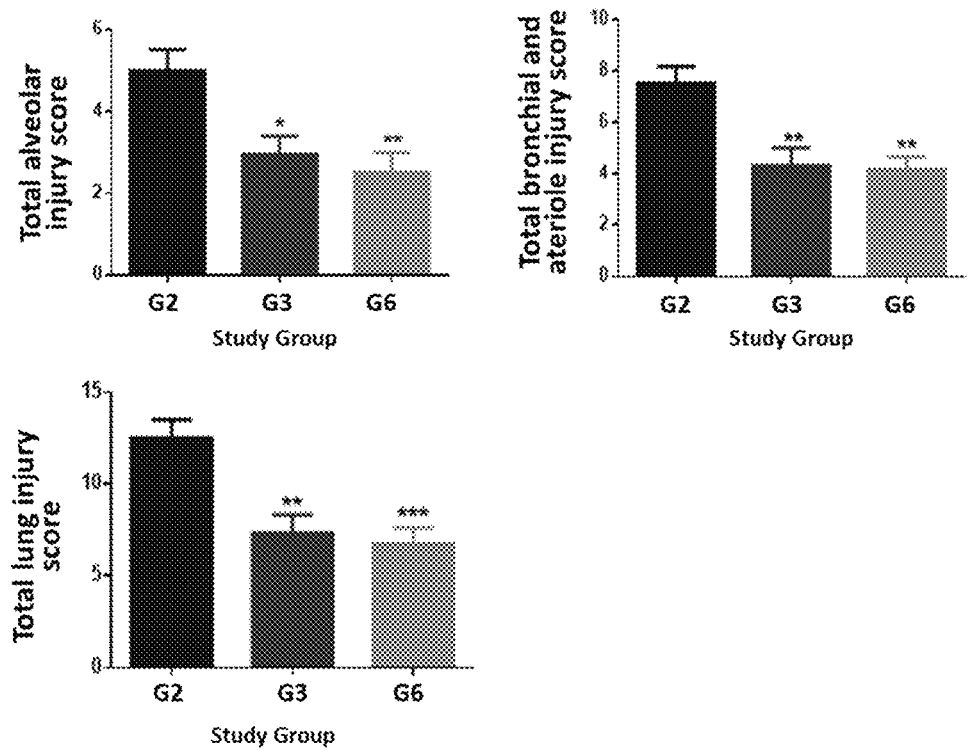

FIG. 5 depicts the histopathological results and analysis of lung injury of the model study described in Example 2. FIG. 5A depicts the scoring based on total alveolar injury (notation in Figure corresponds to variance analysis results (one way ANOVA) as follows: *$p<0.05$ vs. sham, $p<0.01$ vs. sham, *$p<0.001$ vs. sham, #$p<0.05$ vs. model). FIG. 5B depicts scoring based on total bronchial and arteriole injury scoring notation corresponds to variance analysis results (one way ANOVA) as follows: *$p<0.001$ vs. sham, #$p<0.05$ vs. model, ###$p<0.001$ vs. model, &$p<0.05$ vs G3, &&&$p<0.001$ vs. G3.) FIG. 5C depicts scoring based on total lung injury (notation in Figure corresponds to variance analysis results (one way ANOVA) as follows: *p<0.001 vs. sham, #p<0.05 vs. model, ##p<0.01 vs. model, ###p<0.001 vs. model). FIG. 5D depicts a comparison between study groups G2, G3 and G6 with respect to total alveolar injury scoring, total bronchial and arteriole injury scoring, and total lung injury scoring (notations corresponds to variance analysis results (one way ANOVA): *p<0.05 vs. model, p<0.01 vs. model, *p<0.001 vs. model.)

The study groups G1 to G8 indicated in FIGS. 3 to 6 correspond to the study groups as described in Example 2: G1—sham (no LPS induction), G2—model (LPS induction, no drug treatment); G3—positive control (0.5 mg/kg dexamethasone), G4—1 mg/kg Compound I, G5—3 mg/kg Compound I, G6—1 mg/kg Compound I and 0.5 mg/kg dexamethasone, G7—3 mg/kg Compound I and 0.5 mg/kg dexamethasone; and G8—3 mg/kg CsA.

DETAILED DESCRIPTION OF THE INVENTION

In a first aspect, the present disclosure relates to Compound I or a pharmaceutically acceptable salt thereof for use in preventing, and/or treating an organ injury or a condition associated with an organ injury in a subject diagnosed with, or suffering from an infection.

Compound I is a derivative of cyclosporin A, substituted at position 3 (sarcosine, otherwise known as N-methylglycine) by a N,N-dimethylaminoethoxy residue, and its synthesis and preparation has been described, for example in WO2019/0169572. Compound I as depicted above may be referred to in accordance with one of its chemical names as [(R)-2'(2-dimethylaminoethoxy)-Sar]$^3$ cyclosporin A. It is to be understood herein that the Compound I as described within the context of the present disclosure and invention, may refer also to in addition to any pharmaceutically acceptable salt thereof, also its enantiomer, diastereomers or racemates as well as its polymorphs, hydrates or complexes. In an alternative and optional embodiment, Compound I may be provided as a mixture of the (R) and(S) stereoisomers at the 3-sarcosine position. Included is also the use of an optically pure stereoisomer of Compound I, as well as the use of a combination of its stereoisomers. The phase 'optically pure', interchangeable with the term 'stereochemically pure' refers to a compound having a level of stereochemical purity as recognized by one skilled in the art, based on conventional methods for the determination of stereochemistry and stereochemical purity. In a further and optional embodiment, Compound I or a pharmaceutically acceptable salt thereof may be provided as an isotope, for example where one or more of its atoms is replaced with an isotope such as $^{13}$C, or with deuterium.

Compound I as described herein may be used in the prevention, the treatment or both preventing and treating an organ injury, or a condition associated with an organ injury. The term organ injury may refer to any damage, impairment, reduction or loss of one or more functions of an organ or tissue associated with said organ. Injuries may include, but are not limited to, changes in organ tissue or structure in the form of damage or change from the norm, for example, the development of areas of tissue necrosis, or disruption or loss of integrity of cellular or tissue structures, or an abnormal aggregation of cellular matter or debris from for example, cell inflammation processes or cell apoptosis. It will be appreciated that different organ and tissue types may present different injury pathologies. An organ injury may also lead to the pathogenesis of a condition or disease associated with said injury, i.e. a condition associated with the organ injury.

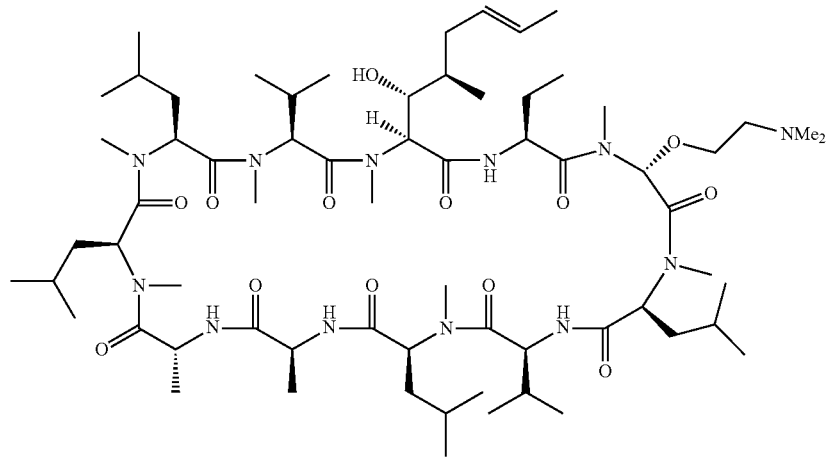

Compound 1

The organ injury or a condition associated therewith, in one embodiment according to the present disclosure, is a consequence of an infection. In one embodiment, Compound I or a pharmaceutically acceptable salt thereof may be used for preventing, or for treating organ injuries or associated conditions, wherein the injury or associated condition is, or would be a direct outcome or result of a pathogenic infection in said organ. In other words, Compound I may be provided to prevent and/or to treat an organ injury or condition arising from an infection that is directly affecting or affects the same organ or tissue, or anatomy. An organ injury which is a consequence of an infection, however, also includes injuries which may be indirectly caused by an infection.

In one embodiment, Compound I may be provided to a subject to prevent, or to treat an organ injury which may be an indirect result of an infection which is affecting or predominantly localized or originating from another i.e. different organ, tissue or physical anatomy or aspect of the subject. In such circumstances, it may be that conditions or pathologies arising from the infection of one anatomy may affect and cause injury in another. For example, Compound I may be administered to a subject suffering from an infection of the respiratory tract, for the prevention or treatment of a respiratory tract organ or tissue-related injury or condition associated therewith, but also in addition, or specifically only, for the prevention or treatment of a kidney injury in said subject. In another example and optional embodiment, the Compound I may be administered to a subject suffering from a blood infection for use in the prevention, and/or treatment of an injury to the tissues of the lung and/or kidney.

An infection may refer to any disease or associated condition that is caused by the presence or proliferation of one or more pathogenic (micro) organisms. Infections may, for example, initiate an acute inflammatory response, i.e. trigger the release of inflammatory mediators and/or recruitment or infiltration of inflammatory cells, which in turn may lead to disruption and injurious changes to normal function of cells and at a macroscopic level, disrupt or reduce the function of associated tissues and organs. Pathogenic organisms which may induce or cause infections include viruses, bacteria, fungi, protozoa, or parasites. In one embodiment of the present disclosure, Compound I or a pharmaceutically acceptable salt is administered for the prevention, and/or the treatment of an organ injury in a subject suffering from, or diagnosed with a viral infection. In another embodiment, the infection is a bacterial infection.

In one embodiment, Compound I in accordance with the present disclosure may be used for the treatment of an organ injury or associated condition in a subject suffering from, or diagnosed with an infection, wherein the infection is a respiratory, renal, hepatic, cardiac, blood or systemic infection, or any combination thereof.

In one specific embodiment, the infection is a respiratory infection. A respiratory infection may be an infection of the respiratory apparatus including any one or combination of the lung or respiratory tract, such as the upper respiratory tract, e.g. the nasal cavity, larynx, pharynx, sinuses, or the lower respiratory tract e.g. the trachea, one or either lung (left and/or right), bronchi, bronchioles or alveoli. In another specific embodiment, the infection is a renal infection.

A subject suffering from an infection may be understood as a subject, such as a human subject having one or more clinically recognized symptoms or conditions associated with an infection with said one or more pathogenic (micro) organisms. Said subject may also alternatively or in addition may have been clinically diagnosed with the infection, wherein a relevant diagnostic test has been carried out confirming or indicating a relevant or meaningful presence of a pathogenic organism or a biomarker associated with said organism, for example from a provided sample, such as from a body fluid (e.g. blood, saliva, urine, faecal sample, etc.) or body tissue biopsy sample. In one embodiment, Compound I or a pharmaceutically acceptable salt thereof may be used to treat a subject diagnosed with an infection. Said subject may be suffering from said infection while undergoing treatment or prophylaxis with Compound I, i.e. having one or more clinically recognized symptoms. In another embodiment, the subject may be treated or provided with Compound I subsequent to a reduction or successful treatment of one or more clinically recognized symptoms, to prevent a reoccurrence or further progression of the organ injury.

As used herein, the term 'treating' or 'treatment' which may be used interchangeably with the term 'therapy' relates to a therapeutic intervention capable of effecting a cure, improvement, amelioration, control, e.g. of progression, of a disease or a condition or symptom associated with said disease or condition.

As understood herein the term 'prevention', which may be used interchangeably with the term 'prophylaxis' refers to the use of a compound, or composition, for preventing the occurrence of a disease, condition or symptom, or significantly reducing the likelihood of occurrence of a disease, condition or symptom, as well as the prevention of, for example, a further reoccurrence of a disease, condition or associated symptom. Also included within the meaning of the term is the prevention of a progression of a disease, condition or associated symptom, after an initial improvement or after initial removal of the cause of the disease, condition or symptom.

For example, and in one specific embodiment, Compound I or a medicament comprising Compound I, may be used for the prevention of an organ injury or an associated condition, i.e. for the prevention of an occurrence of an injury to the organ of a subject, or a condition arising from an injury of the organ of a subject. In another specific embodiment, Compound I may be used to reduce the progression of the organ injury or condition associated with said injury, e.g. where the patient may already be exhibiting a clinically observable mild or moderate form of the organ injury or a condition associated with said injury, but wherein the subject may be at risk of developing, or progressing to a more clinically more severe or acute form of the organ injury or a condition associated thereof. In a related embodiment, said organ may be a lung.

In one embodiment, Compound I or a pharmaceutically acceptable salt thereof may be used for the prevention and/or treatment of any organ injury, or a condition associated with an organ injury, wherein the organ is selected from a lung, kidney and/or heart. As understood herein, the term organ may refer to the organ as a whole, or any anatomical structure or specific tissue thereof. Likewise, the term kidney may refer to either one or both kidneys, and may also encompass specific tissues which are associated with the kidney. The lung may refer to either individual, or both left or right lung structures, or tissues such as the bronchiole or alveoli, or epithelial/endothelial tissue associated therewith, and may also include other related aspects of the respiratory tract or apparatus.

As noted above, infectious diseases caused by pathogenic organisms may cause an innate immune response characterized by an activation of various different immune pathways as a form of beneficial host defense against the infection, but these may also become deleterious, resulting in cell and tissue damage or injuries. In respiratory infections, the lung(s) and their associated tissues in particular may become severely affected and damaged. Thus there is a need to provide a preventative means or therapy against tissue damage (such as to the lungs), or the progression thereof during infection. In one specific embodiment, Compound I or a pharmaceutically acceptable salt thereof is used for the prevention, or treatment of lung injury, or a condition associated with a lung injury. In particular, Compound I may be used for treating or preventing lung injury in a patient suffering from, or diagnosed with an infection, e.g. a respiratory tract infection. Lung injury, or a condition or symptom associated with lung injury may comprise any one or combination of: damage to a respiratory tissue (e.g. epithelium or endothelium) of e.g. the bronchi, bronchioles, alveoli, or tissue/cellular structures associated therewith, alveolar damage, pulmonary or alveolar infiltration, dyspnea, pulmonary edema, pulmonary fibrosis, hypoxemia, pneumonia, or bronchiolitis, or combinations thereof.

Compound I in particular may be useful in treating as well as preventing the progression of lung injuries, including acute lung injuries. In a model study for acute lung injury as further described below in the Examples, it was found that Compound I was unexpectedly effective in preventing and treating the deterioration and damage to lung tissue in general, and specifically in the bronchioles, arterioles, and alveoli, analogously to the known anti-inflammatory corticosteroid dexamethasone.

Compound I was in addition found to be effective when administered at the same time as dexamethasone, and surprisingly, a synergistic effect was observed, in terms of efficacy towards treating or reducing the level of lung tissue damage, and specifically in the bronchiole and arteriole tissue, and alveoli, arising from acute lung injury.

Acute lung injury (also sometimes abbreviated as ALI), which causes acute and progressive respiratory distress, and may be characterized for example by any one or combination of alveolar damage or hemorrhage, pulmonary infiltration, pulmonary edema, acute or severe hypoxemia (low oxygen concentration in the blood), vascular damage. A synonym for acute lung injury, and which may sometimes be used to characterize the more severe forms of acute lung injury is acute respiratory distress syndrome (often abbreviated as ARDS). One of the diagnostic criteria for ALI/ARD is hypoxemia, as defined by a ratio of arterial pressure of oxygen ($PaO_2$) and the fraction of inspired oxygen ($FiO_2$). A milder form of ALI/ARD may for example, be approximately characterized by hypoxemia in the range of $PaO_2/FiO_2$ as 200-300 mmHg, whereas moderate hypoxemia may be considered in the range of 100-200 mgHg, and severe hypoxemia as falling in the range of as less than 100 mmHg. High mortality rates are associated with these acute lung injuries and conditions.

In one embodiment, Compound I or a pharmaceutically acceptable salt thereof may be used for the prevention and/or treatment of lung injury or condition associated with the lung injury, wherein the lung injury is acute hypoxic respiratory insufficiency or failure, acute lung injury (ALI) or acute respiratory distress syndrome (ARDS), in a subject diagnosed or suffering from an infection e.g. a respiratory infection. In a related embodiment, Compound I may be used for preventing the development of, or the progression of a lung injury or a condition associated therewith, in a subject suffering from an infection, e.g. a respiratory infection to more severe form of the lung injury e.g. acute lung injury (ALI) or acute respiratory distress syndrome (ARDS), or more severe forms thereof.

In another embodiment, Compound I or a pharmaceutically acceptable salt thereof is used for the prevention or treatment of lung injury, or an associated condition thereof such as described above, wherein Compound I is administered to the subject in need thereof, before, simultaneously with, and/or after treatment with oxygen support, or mechanical ventilation. In another embodiment, Compound I may be administered for use in the prevention and/or treatment of an organ injury, e.g. lung injury, simultaneously or concomitantly with other remedies or therapies targeted, for example at treating the infection.

In one embodiment, Compound I is used in the prevention and/or treatment of an organ injury, such as a lung injury, or conditions associated therewith, in a subject diagnosed with, or suffering from an infection, together with a second active ingredient or drug. In one embodiment, Compound I is administered to a subject receiving a second active ingredient. For example, Compound I, or a medicament comprising Compound I may be administered to a subject within a same treatment period or phase as that of one or more other drug-based therapies. In some embodiments, Compound I can be administered to a subject receiving more than one other active ingredient.

In one embodiment, Compound I is used in accordance with any one or combination of the uses defined herein, wherein the use further comprises separate or sequential administration of a second active ingredient to the subject. In a sequential administration, Compound I may for example be administered to a subject in need thereof, followed or preceded by the administration of a second active ingredient. In other embodiments, the administration of a second active ingredient can be simultaneous, i.e. administered essentially at the same time, or treatment period as Compound I. In one embodiment, a composition or medicament comprising a combination of Compound I and a second active ingredient may be administered.

Compound I may be administered together, e.g. as a co-treatment, or in combination with a second active ingredient for preventing and/or treating a lung injury or conditions associated therewith, which may be caused or induced by an infection, e.g. a respiratory infection, such as caused by a viral or bacterial infection. The lung injury as well as the respiratory infection may be in accordance with any one or combination of the embodiments further described herein.

In particular, the second active ingredient may be an anti-inflammatory agent. Alternatively, the second active ingredient may be an anti-infective agent such as an antibacterial agent or anti-viral agent. In a specific embodiment, the second active ingredient is a corticosteroid. In a further embodiment, the second active ingredient is dexamethasone. Dexamethasone has anti-inflammatory activity, and thus may be useful in treating conditions such as lung injury and related conditions. However, dexamethasone also has immunosuppressive activity, and administration thereof especially at higher doses or for longer term treatment may also be associated with undesirable side effects, such as hyperglycemia, or high blood pressure. Thus, longer periods of treatment or higher dose regimens may not be ideal for all patients. It has been found that co-administration of Compound I with dexamethasone appears to provide a beneficial and synergistic effect with respect to treating acute lung injury and its related conditions, for example in respect of overall reducing the level of physical injury or damage to lung tissue (e.g. bronchiole and arteriole, or alveoli injury), According to one aspect of the disclosure, dexamethasone may be administered to a subject at a lower dose when given at the same treatment period as Compound I, compared to a dose which would be administered when only dexamethasone is administered as a treatment, e.g. for the treatment of a lung injury or condition associated with a lung injury.

In a specific embodiment, Compound I is administered to a subject also receiving a corticosteroid treatment such as a dexamethasone, to prevent and/or treat a lung injury or a condition associated with the lung injury, which may be caused or induced by a respiratory infection. Compound I may be administered as an adjunct or co-treatment with the corticosteroid. In one embodiment, Compound I or a pharmaceutically acceptable salt thereof is used for the prevention and/or treatment of lung injury or condition associated with the lung injury, wherein the lung injury is acute hypoxic respiratory insufficiency or failure, acute lung injury (ALI) or acute respiratory distress syndrome (ARDS), in a subject diagnosed or suffering from a respiratory infection such as described herein, wherein the subject is also receiving treatment with a corticosteroid such as dexamethasone.

The disclosure also further relates to the use of Compound I or a pharmaceutically acceptable salt thereof in the manufacture of a medicament or a kit for use in the prevention and/or treatment of an organ injury, such as a lung injury, wherein the medicament or kit is packaged with written instructions describing the administration of Compound I with a second active ingredient, such as a corticosteroid, e.g. dexamethasone. As noted above, the pathogenic organisms which may induce or cause infections may include viruses, bacteria, fungi, protozoa, or parasites. In one optional embodiment, the subject to be treated according to the present disclosure has an infection caused by one or more virus, bacteria or other microorganism.

Examples of viruses which may cause infections may include but are not limited to viruses affecting the respiratory system. Examples of respiratory viruses i.e. viruses which infect, and/or cause respiratory conditions are influenza virus, rhinovirus, adenovirus, respiratory syncytial virus, coronavirus, parainfluenza virus, and dengue virus. As used herein, the term an 'influenza virus' or a 'coronavirus' or similar in reference to any type of virus disclosed herein, may refer to, or include any subtype, strain or variant associated with said type or classification of virus. In one embodiment said viruses are human viruses i.e. viruses affecting human subjects. In another embodiment, Compound I or a pharmaceutically acceptable salt thereof may be administered to a subject suffering or diagnosed with a viral respiratory infection caused by a coronavirus, for example SARS-COV, SARS-COV2, or MERS-COV virus, for use in the treatment or prevention of an organ injury, e.g. a lung injury or a condition associated therewith, such as described in any one of the above embodiments; and optionally wherein the organ injury, e.g. lung injury is caused by said infection. In yet another embodiment, the respiratory infection is COVID-19, optionally wherein the lung injury is cause by said respiratory infection.

Examples of bacteria which may cause infections include bacteria which may affect the respiratory system. In one embodiment, Compound I or a pharmaceutically acceptable salt thereof is used for the prevention or treatment of an organ injury or a condition associated therewith, in a subject diagnosed with, or suffering from a bacterial infection. In a related embodiment, the organ is the lung. In a further embodiment, the bacteria causing a bacterial infection is a gram-negative bacteria. In another embodiment, the bacteria causing a bacterial infection in the subject to be treated is a gram-positive bacteria. In yet a further embodiment, the infection is a bacterial infection, optionally a respiratory bacterial infection, and Compound I or a salt thereof is administered to a subject for the prevention and/or treatment of lung injury or a condition associated with lung injury, wherein the infection is caused by a *pseudomonas* bacteria (e.g. *Pseudomonas aeruginosa*), a *klebsiella* bacteria (e.g. *Klebsiella pneumoniae*), a haemophilius bacteria (e.g. *Haemophilus influenzae*), a *streptococcus* bacteria (e.g. *Streptococcus pneumoniae*), a *staphylococcus* bacteria (e.g. *Staphylococcus aureus*), or *legionella* bacteria (e.g. *Legionella pneumophila*). It will be understood, for example that the term 'a *pseudomonas* bacteria' or similar in reference to any one of the bacteria species disclosed herein, may refer to, or include any subtype, strain or variant associated with said type or classification of bacteria.

In other embodiments, the subject according to the present disclosure may be diagnosed with or suffering from an infection caused by a fungus, or parasites. Examples of fungi which give rise to fungal infections include *aspergillus*, or *candida. Parasites may include, for example protozoa, e.g. plasmodia, which causes malarial infection, or a helminth.*

In one embodiment, Compound I may be used to treat an organ injury, e.g. any one or combination of a lung or kidney, or cardiac injury, or a condition associated with the injury, wherein a subject is diagnosed or suffering from a viral infection; optionally wherein said injury is a direct consequence of the infection, e.g. wherein the infection is an infection of said organ. In another embodiment, Compound I, or an acceptable salt thereof may be used to treat an organ injury, e.g. any one or combination of a lung, kidney or cardiac injury, or a condition associated with the injury, wherein the subject is diagnosed or suffering from a bacterial infection; optionally wherein said injury is a direct consequence of the infection, e.g. wherein the infection is an infection of said organ.

In yet another embodiment, Compound I or a pharmaceutically acceptable salt thereof may be used in the prevention and/or treatment of at least two different organ injuries or condition associated with said organ injuries, in a subject diagnosed or suffering from an infection, e.g. a respiratory infection. For example, the compound may be administered to prevent and/or treat lung injury, or an associated condition, and also to prevent/treat injury to the kidney(s), or a condition associated therewith. In one embodiment, the compound is administered to prevent or protect against occurrence or progression of lung as well as kidney injuries in a subject suffering or diagnosed with an infection, for example a respiratory infection, further optionally wherein the subject would be in particular at risk, due to other disorders or clinical manifestations, of developing lung and kidney injuries or more severe forms thereof. An example of kidney injury or an associated condition thereof is acute kidney injury.

As understood herein, the term 'subject' may be used interchangeably with the term 'patient'. In one preferred embodiment, the subject is a human subject In an optional embodiment, the subject may be other animals, such as other mammals. In an optional embodiment, the invention may also have application, for instance, in farm animals or other veterinary subjects, in particular mammals such cats, dogs, primates, horses, cows, and pigs.

Compound I, or a pharmaceutically acceptable salt thereof may be formulated in a composition or a medicament which comprises a therapeutically (or prophylactically) effective dose of Compound I, i.e. a dose in which is sufficient to have a pharmacological effect in terms of treatment or prevention of the targeted organ injury, disease or an associated condition or symptom. The medicament or composition in one embodiment, comprises at least one unit dose of Compound I or a pharmaceutically acceptable salt thereof. A unit dose of Compound I may refer to a unit dose of Compound I, or a pharmaceutically acceptable salt thereof as such, but may also be applicable to a medicament, or composition or dosage form comprising said unit dose of the compound or its salt A unit dose can be expressed as an amount per weight basis (e.g. mg/kg) that may be provided, based on the weight of a subject or weight range or a subject. Unit dose may also alternatively be expressed in terms of absolute amount (e.g. weight amount, such as mg) of Compound I which may be provided to subject as a medicament or dosage form which is appropriate to the intended route of administration. In one embodiment, the unit or a single dose of Compound I may be in the range of between about 0.005 to 20 mg/kg. The term 'dose' or 'dosage' may refer to a single, or unit dose of Compound I or a pharmaceutically acceptable salt thereof, or a drug substance, unless prefaced or followed by an indication of time, time interval or indication of quantity. A 'daily dose' or 'dosage per day' for example may refer to the total dose amount of Compound I or drug substance administered in the course of one day (24 hours). A daily dose may comprise only one dose, if only one dose is administered once per day but may also be a total based on the sum of multiple unit doses that administered during a day, for example, if more than one unit dose is administered at two or more timed intervals during a day.

When used herein the term 'about' or the like in connection with an attribute or value such as dose amount includes the exact attribute or precise value, as well as any attribute or value typically considered to fall within the normal or accepted variability associated with the technical field, and methods of measuring or determining said attribute or value. The term allows for any variation which in the common practice would allow for the product being evaluated to be considered bioequivalent in a mammal to the recited strength or dose of a claimed product.

The use of Compound I or a pharmaceutically acceptable salt thereof or a method of treatment or prevention as described in any one of the embodiments herein is also provided in the context of the present disclosure, for the manufacture or preparation of a medicament or medicine adapted and prescribed for said uses or methods of treatment and/or prophylaxis. The medicament, or a composition comprising Compound I or a pharmaceutically acceptable salt thereof provided as a medicament, is preferably administered, or is adapted for administration to a human subject A pharmaceutically acceptable salt of Compound I is a salt which retains its biological properties, and which is non-toxic and is compatible for pharmaceutical use. Salts of the invention may result from the addition of acids to the Compound I. The resultant acid addition salts include those formed with acetic, 2,2 dichloroacetic, citric, lactic, mandelic, glycolic, adipic, alginic, aryl sulfonic acids (e.g., benzenesulfonic, naphthalene-2-sulfonic, naphthalene-1,5-disulfonic and p-toluenesulfonic), ascorbic (e.g. L-ascorbic), L-aspartic, benzoic, 4-acetamidobenzoic, butanoic, (+) camphoric, camphor-sulfonic, (+)-(1S)-camphor-10-sulfonic, capric, caproic, caprylic, cinnamic, citric, cyclamic, dodecylsulfuric, ethane-1,2-disulfonic, ethanesulfonic, 2-hydroxyethanesulfonic, formic, fumaric, galactaric, gentisic, glucoheptonic, gluconic (e.g. D-gluconic), glucuronic (e.g. D-glucuronic), glutamic (e.g. L-glutamic), α-oxoglutaric, glycolic, hippuric, hydrobromic, hydrochloric, hydriodic, isethionic, lactic (e.g. (+)-L-lactic and (+)-DL-lactic), lactobionic, maleic, malic (e.g. (−)-L-malic), (+)-DL-mandelic, metaphosphoric, methanesulfonic, 1-hydroxy-2-naphthoic, nicotinic, nitric, oleic, orotic, oxalic, palmitic, pamoic, phosphoric, propionic, L-pyroglutamic, salicylic, 4-aminosalicylic, sebacic, stearic, succinic, sulfuric, tannic, tartaric (e.g. (+)-L-tartaric), thiocyanic, undecylenic and valeric acids. In particular acid addition salts include those derived from mineral acids such as hydrochloric, hydrobromic, phosphoric, metaphosphoric, nitric and sulfuric acids; from organic acids, such as tartaric, acetic, citric, malic, lactic, fumaric, benzoic, glycolic, gluconic, succinic, arylsulfonic acids.

Compound I or a pharmaceutically acceptable salt thereof may be administered enterally or parenterally to a subject. In one embodiment, Compound I, or a composition or a medicament comprising said Compound I is adapted for administration or is administered parenterally, for example by intravenous injection or by sub-cutaneous, or intramuscular injection, or by intravenous or subcutaneous infusion. In an alternative embodiment, Compound I, or a composition or medicament comprising Compound I may be adapted for administration, or may be administered to a subject enterally, for example orally. In another embodiment, Compound I, or a composition or medicament comprising Compound I may be formulated or adapted for inhalative administration.

The present disclosure may also relate to a medicament comprising a pharmaceutical composition comprising a Compound I or a pharmaceutically acceptable salt thereof, and one or more pharmaceutically acceptable excipients. The medicament, or pharmaceutical composition comprising said Compound I may be formulated in a dosage form suitable or adapted for injection or infusion, inhalation or any one of the administration methods described herein. For oral administration, the medicament or pharmaceutical composition comprising Compound I may be provided in a dosage form suitable or adapted for oral administration, for example but not limited to, a tablet, capsule, gelcap, or film. Said medicament, or pharmaceutical composition may be used in accordance with any of the methods of treatment or prevention, or uses described herein.

The present invention may in a further aspect, also relate to a kit, or a medicament comprising a composition comprising Compound I or a pharmaceutically acceptable salt thereof, and optionally wherein the kit or medicament is packaged with instructions for the administration of Compound I or a salt thereof in accordance with any one of the methods or uses described herein. In a related embodiment, the kit may comprise instructions for administration of Compound I to a subject, wherein the subject is receiving or will receive a second active ingredient, such as a corticosteroid, e.g. dexamethasone, wherein the instructions indicate a sequential, or simultaneous administration of Compound I and the second active ingredient, in accordance with any of the methods/uses as described here. The kit, in another embodiment may comprise Compound I or a pharmaceutically acceptable salt thereof, and a second active ingredient. The second active ingredient in some embodiments is a corticosteroid, e.g. dexamethasone. In one embodiment, the kit may comprise a first composition comprising Compound I, and a second composition comprising a corticosteroid, e.g. dexamethasone. In an optional embodiment, the kit may comprise a composition comprising Compound I and a second active ingredient, for example a composition comprising Compound I and a corticosteroid, such as dexamethasone.

The following list of numbered items are further embodiments comprised in the present disclosure:
1. Use of Compound I or a pharmaceutically acceptable salt thereof

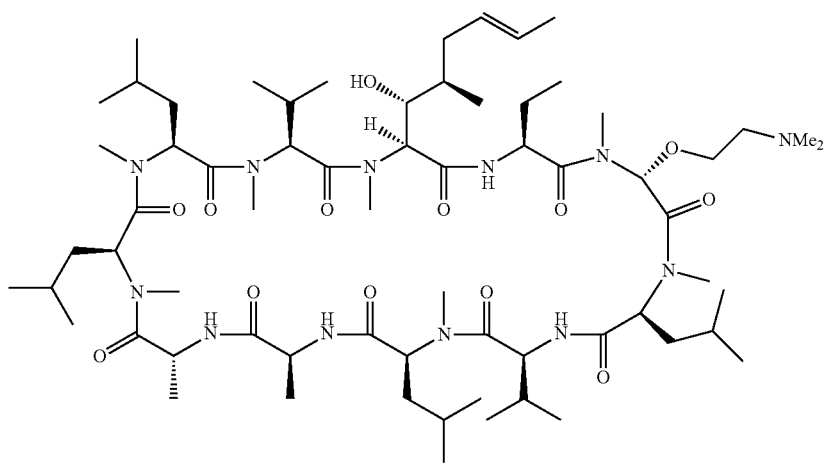

Compound 1 in the manufacture of a medicament for the prevention and/or treatment of an organ injury or a condition associated with an organ injury in a subject diagnosed with, or suffering from an infection.
2. The use according to item 1, wherein the medicament is for the prevention of an organ injury or a condition associated with an organ injury in a subject diagnosed with, or suffering from an infection.
3. The use according to item 1, wherein the organ injury or condition associated therewith is a consequence of the infection.
4. The use according to any one of items 1 or 2, wherein the infection is viral, bacterial, fungal, protozoan, or parasitic.
5. The use according to any one of the preceding items, wherein the infection is a viral infection.
6. The use according to any one of the preceding items, wherein the infection is a bacterial infection.
7. The use according to any one of the preceding items, wherein the infection is a fungal infection.
8. The use according to any one of the preceding items, wherein the infection is a protozoan or parasitic infection.
9. The use according to any one of the preceding items, wherein the infection is a respiratory, renal, hepatic, cardiac, blood or systemic infection, or any combination thereof
10. The use according to any one of the preceding items, wherein the infection is a respiratory infection.
11. The use according to any one of the preceding items, wherein the organ is selected from a lung, kidney, and/or heart.
12. The use according to any one of the preceding items, wherein the organ is a lung.
13. The use of Compound I or a pharmaceutically acceptable salt thereof in the manufacture of a medicament for the prevention and/or treatment of a lung or lung tissue injury or a condition associated with a lung or lung tissue injury.
14. The use according to any one of items 12 or 13, wherein the lung injury, or a condition associated with the lung injury is damage to the respiratory tissue or epithelium e.g. any one or combination of bronchi, bronchioles, alveoli, or tissue associated therewith; alveolar damage, pulmonary or alveolar infiltration, dyspnea, pulmonary edema, pulmonary fibrosis, hypoxemia, pneumonia, or bronchiolitis, or a combination thereof.
15. The use according to any one of items 12 to 14, wherein the medicament is used for preventing the development, or the progression of damage to the respiratory tissue or epithelium, e.g. any one or combination of bronchi, bronchioles, alveoli, or tissue associated therewith; alveolar damage, pulmonary or alveolar infiltration, dyspnea, pulmonary edema, pulmonary fibrosis, hypoxemia, pneumonia, bronchiolitis, or a combination thereof.
16. The use according to any one of items 12 to 15, wherein the lung injury or condition associated with the lung injury is acute hypoxic respiratory insufficiency or failure, acute lung injury (ALI) or acute respiratory distress syndrome (ARDS).
17. The use according to any one of items 12 to 16, wherein the medicament is used for preventing the development, or the progression of acute lung injury (ALI) or acute respiratory distress syndrome (ARDS) in a subject suffering from a respiratory infection.
18. The use according to any one of items 10 to 17, wherein the infection is a respiratory viral infection and optionally caused by a respiratory virus, e.g. an influenza virus, a rhinovirus, a respiratory syncytial virus, an adenovirus, a coronavirus (CoV), a dengue virus, or a parainfluenza virus.
19. The use according to item 18, wherein the viral respiratory infection is caused by a coronavirus, and optionally wherein the coronavirus is a SARS-COV, SARS-CoV2, or MERS-COV.
20. The use according to item 19, wherein the respiratory infection is COVID-19.
21. The use according to item 10 to 17, wherein the infection is a respiratory bacterial infection, and optionally is caused by a gram-negative and/or a gram-positive bacteria, further optionally wherein the bacteria is a *pseudomonas* bacteria (e.g. *Pseudomonas aeruginosa*), a *klebsiella* bacteria (e.g. *Klebsiella pneumoniae*), a *haemophilus* bacteria (e.g. *Haemophilus*

*influenzae*), a *streptococcus* bacteria (e.g. *Streptococcus pneumoniae*), a *staphylococcus* bacteria (e.g. *Staphylococcus aureus*), or *legionella* bacteria (e.g. *Legionella pneumophila*).

22. The use according to any one of the preceding items, wherein the respiratory infection is a lower respiratory tract infection.
23. The use according to any one of the preceding items, wherein the respiratory infection is an upper respiratory tract infection.
24. The use according to any one of the preceding items, wherein the medicament is administered to a subject in need thereof before, simultaneously with, and/or after a treatment with oxygen support or mechanical ventilation.
25. The use according to any one of the preceding items, wherein the subject diagnosed with, or suffering from an infection is receiving a second active ingredient
26. The use according to item 25, wherein the second active ingredient is a corticosteroid, e.g. dexamethasone.
27. The use according to item 25 or 26, wherein the subject is diagnosed with, or suffering from a respiratory infection, e.g. a viral respiratory infection.
28. The use according to item 27, wherein the medicament is used for preventing the development, or the progression of acute lung injury (ALI) or acute respiratory distress syndrome (ARDS) in the subject suffering from the respiratory infection, e.g. a viral respiratory infection.
29. The use according to items 25 to 28, wherein the medicament is packaged with written instructions for the administration of Compound I to a subject receiving the second active ingredient, wherein the instructions indicate a sequential, or simultaneous administration of the medicament and the second active ingredient.
30. The use according to any one of items 1 to 11, wherein the organ is a kidney.
31. The use according to preceding item 30, wherein the infection is a respiratory infection; optionally wherein the infection is a viral or a bacterial respiratory infection e.g. as defined in items 18 to 24; further optionally wherein the infection is a viral respiratory infection, as defined in items 18 to 20.
32. The use according to any one of items 30 or 31, wherein the kidney injury, or a condition associated with kidney injury is acute kidney injury (AKI).
33. The use according to any one of items 30 to 32, wherein the medicament is used for preventing the development, or the progression of acute kidney injury in a subject suffering from a respiratory infection.
34. The use according to any one of the preceding items wherein the medicament is for use in the prevention and/or treatment of at least two different organ injuries or condition associated with said organ injuries, in a subject with a respiratory infection.
35. The use according to item 34, wherein the medicament is for use in the prevention and/or treatment of lung and kidney injuries and their associated conditions.
36. The use according to item 35, wherein the medicament is for use in the prevention of lung and kidney injuries and their associated conditions.
37. The use according to any one of the preceding items, wherein the subject is a human subject.
38. The use according to any one of the preceding items, wherein the medicament is administered, or is adapted for administration to a human subject.
39. The use according to any one of the preceding items, wherein the medicament is administered by injection or infusion, inhalation, or by oral administration.
40. The use according to any one of the preceding items, wherein the medicament comprises at least one unit dose of Compound I or a pharmaceutically acceptable salt thereof, wherein the unit dose is between about 0.005 to 20 mg/kg.
41. Compound I or a pharmaceutically acceptable salt thereof

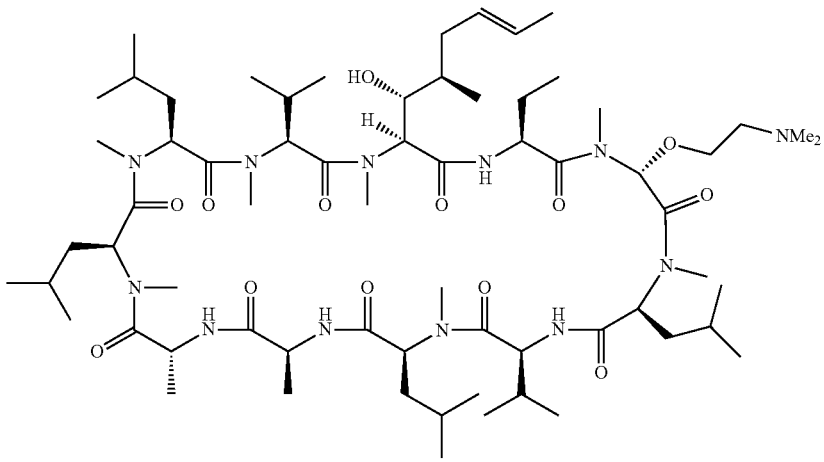

Compound 1 for use in the prevention and/or treatment of an organ injury or a condition associated with an organ injury in a subject diagnosed with, or suffering from an infection.

42. Compound I or pharmaceutically acceptable salt thereof for use according to the preceding item, wherein the use comprises any one or combination of features or embodiments as described in items 1 to 40.
43. A method for preventing, and/or treating an organ injury in a subject diagnosed with, or suffering from an infection, the method comprising a step of administering to the subject, a Compound I or a pharmaceutically acceptable salt thereof.

44. The method according to the preceding item, wherein the method comprises any one or combination of features or embodiments as described in items 1 to 40.

The following examples serve to illustrate the invention, however, should not be understood as restricting the scope of the invention.

EXAMPLES

Example 1—Acute Lung Injury Model Study

Compound I was tested in an in vivo mouse model for acute lung injury.

LPS (lipopolysaccharide) was administered to induce lung injury in C57BL/6 mice. LPS elicits an acute inflammatory response in the lung, resulting in progressive damage, and necrosis of lung tissue including the bronchial wall, and alveoli.

| | | Study Groups and Dosing Plan | | |
|---|---|---|---|---|
| Group (G) | LPS Injection | Drug | Administration/ Frequency | Dose |
| G1 | No | n/a | n/a | n/a |
| G2 | Yes | n/a | n/a | n/a |
| G3 | Yes | Dexamethasone | ip, 0.5 hr and 6 hr after LPS | 3 mg/kg |
| G4 | Yes | Compound I | ip, 0.5 hr and 6 hr after LPS | 1 mg/kg |
| G5 | Yes | Compound I | ip, 0.5 hr and 6 hr after LPS | 5 mg/kg |
| G6 | Yes | Compound I | ip, 0.5 hr and 6 hr after LPS | 10 mg/kg |

LPS (0.3 mg/kg) was administered directly to the trachea of anaesthetized mice in study groups 2 to 6. Study Group 1 (G1) served as sham control group (no induced acute lung injury) and Group 2 (G2) served as model group (acute lung injury, no treatment. Each tested group consisted of 10 mice. Dexamethasone, prepared as an aqueous solution, was used as a positive control. Solutions comprising Compound I in different concentrations, a carrier and solubilizer were prepared for the study.

Dexamethasone and Compound I were administered intraperitoneally at 0.5 h and 6 h after the administration of LPS to study groups 3 to 6 (G3 to G6).

Non-invasive lung function tests including respiratory frequency, tidal volume, maximum inspiratory speeds and maximal expiratory speeds were determined on Day 2 and end of the study, 24 h after LPS was initially administered.

Figure 1:
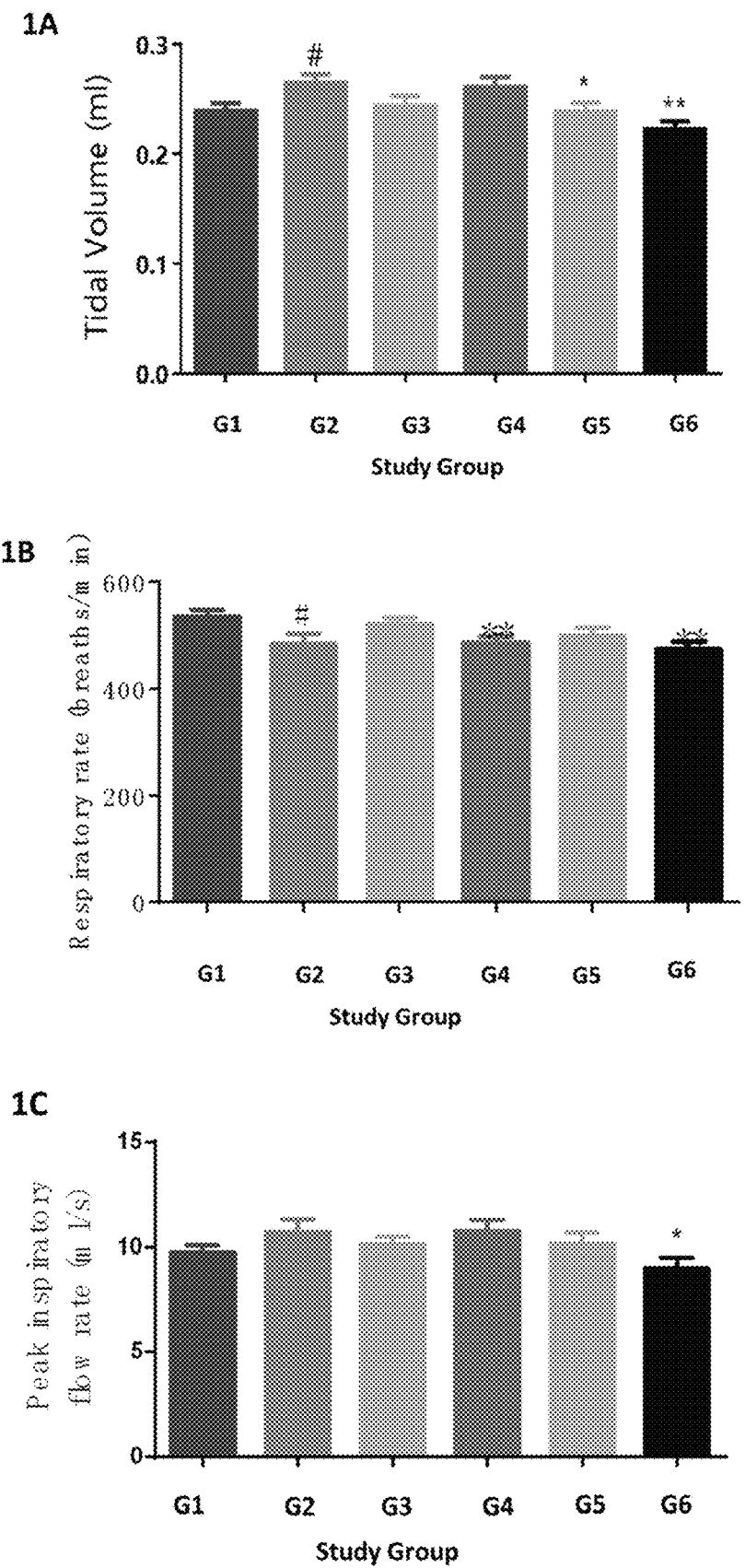
FIG. 1 depicts the pulmonary lung test results obtained at the end of the study described in Example 1.
Figure 1:
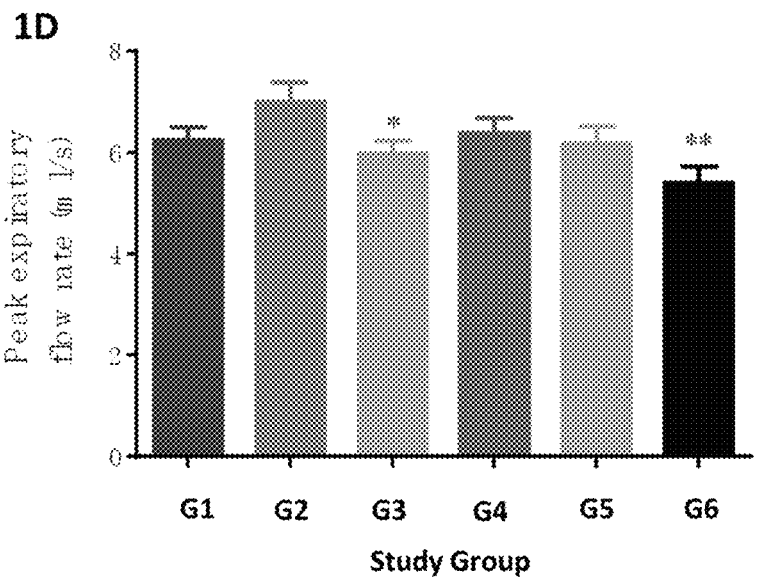

FIG. 1 depicts the pulmonary lung test results obtained. FIG. 1A depicts tidal volume (mL), FIG. 1B depicts respiratory breath rate (breaths/min), FIG. 1C depicts peak inspiratory flow rate (mL/s), and FIG. 1D depicts the peak expiratory flow rate (mL/s). The study groups G1 to G6 as indicated in these figures correspond to the following: G1—sham (no LPS induction), G2—model (LPS induction, no drug treatment); G3—positive control (3 mg/kg dexamethasone), G4—1 mg/kg Compound I, G5—5 mg/kg Compound I, and G6—10 mg/kg Compound I).

It was observed that there were statistically relevant improvements in some of the lung function tests, based on the administration of Compound I after induction of acute lung injury, in particular for the dosing at 10 mg/kg.

A significant impact was moreover observed with regards to the pathology of the lung tissue of the mice subjects. Whole lung tissue samples were also taken at end of study for histological examination. The histological examination comprised random selection of visual field areas which were blind scored for lung injury according to the following criteria: 1) alveolar congestion, 2) hemorrhage, 3) infiltration of inflammatory cells, and 4) thickness of alveolar wall according to a scale of 0 (minimal damage), 1, (mild damage), 2 (moderate damage), 3 (severe damage), and 4 (maximal damage).

Further blind scoring of lung injury was performed according to the following criteria: 1) bronchial wall injury (such as epithelia cell degeneration, wall edema, inflammatory cell in the wall, or micro necrotic foci in the cell wall), 2) bronchial wall inflammatory cell infiltration, 3) arteriole wall injury (e.g. endothelial denudation, media smooth muscle disappear, arterial wall edema) and 4) arteriole wall inflammatory cell infiltration. Scoring was conducted according to a five-point scale of: 0 (no damage, no inflammatory cell infiltration), 1 (mild damage, few focal inflammatory cell infiltration); 2 (moderate damage, less than ½ circle of inflammatory cell infiltration), 3 (severe damage, more than ½ circle of inflammatory cell infiltration) and 4 (maximal damage, multiple layers of circling inflammatory cell infiltration).

FIG. 2 depicts the histological results and analysis of lung injury based on this examination. FIG. 2A depicts the scoring based on total alveolar injury, FIG. 2B depicts scoring based on total bronchial and arteriole injury scoring, and FIG. 2C depicts scoring based on total lung injury. The study groups G1 to G6 are as noted above. It was observed that Compound I at all doses (G4, G5, G6) had a significant effect in terms of decreasing the severity of injuries to bronchial, arteriole and alveolar tissue, in line with the positive control, dexamethasone (G3), and as compared to the lung tissue obtained and analyzed from untreated mice in the model group (G2).

Example 2—Acute Lung Injury Model Study II

A study was conducted to assess the effect of combined administration of dexamethasone and Compound I in an acute lung injury model. LPS (lipopolysaccharide) was administered to induce lung injury in SD rats (SPF grade male, body weight 180-200 g).

| | Study Groups and Dosing Plan | | |
|---|---|---|---|
| Group | # of animals | LPS injection | Drug/Dose |
| G1 | 6 | No | saline |
| G2 | 8 | Yes | saline |
| G3 | 8 | Yes | Dexamethasone 0.5 mg/kg* |
| G4 | 8 | Yes | Compound I 1 mg/kg |
| G5 | 8 | Yes | Compound I 3 mg/kg |
| G6 | 8 | Yes | Compound I 1 mg/kg dexamethasone 0.5 mg/kg |
| G7 | 8 | Yes | Compound I 3 mg/kg dexamethasone 0.5 mg/kg |
| G8 | 8 | Yes | Cyclosporine A 3 mg/kg |

Study group 1 (G1) served as sham control group (no induced acute lung injury) and Group 2 (G2) served as model group (acute lung injury, no treatment).

Dexamethasone, prepared as an aqueous solution, prepared by dissolving the appropriate amount in saline, was used as a positive control in group 3 (G3), and was also administered to group 6 (G6) and group 7 (G7), which also received Compound I. A lyophilized powder of Compound I, was dissolved in an aqueous reconstitution solution comprising Tween 80, acetic acid, sodium acetate, and further diluted with saline before application. Commercially available Cyclosporin A solution (solution for injection, Novartis) was diluted with saline before application.

The animals were weighed. LPS (5 mg/kg) was then injected via the trachea of the rat after anesthesia and surgery to expose the trachea (all groups except for G1 where no LPS was injected). After the animals recovered from the anesthesia, they were transferred back to the cage. The respective drug(s) were administered (iv) to the tail vein 3 times at 1 h, 7 h, and 24 h after LPS injection according to the regime as detailed in the table above.

Non-invasive lung function tests were determined at 24 hours and at 48 hours (end of the study). At the end of study, the animals were also weighed, blood and lung fluid samples were collected, and lung samples were collected from sacrificed animals for pathology analysis.

Results—Lung and body weight of the animals were measured at the end of study. In this study, higher lung weights were generally observed for the groups where acute lung injury was induced compared to the sham group. Increased or larger weight of lung is reflective of the degree of inflammatory process and damage to this organ. Notably, compared to the other treatment groups, a marked increase in the weight of the lung and also in the ratio of lung weight to body weight in study in Group 8 (G8) subjects which received cyclosporin A (CsA), was observed (see FIGS. 3A and 3B). The lung weight/ratio of lung weight to body weight level observed for Group 8 (G8) appears to be even higher than model (G2), suggesting that CsA could be exacerbating the inflammatory processes in some way. It was also observed that the subjects receiving CsA before lung injury induction also generally did not perform as well in some of the lung function tests conducted (see FIGS. 4, for example, FIG. 4D), in comparison to the groups administered with Compound I, or Compound I and dexamethasone after induction of acute lung injury. CsA has been suggested based on earlier modelling as having a protective effect against lung injuries, however, as demonstrated in the current studies appears to be overall less impactful on treating and protecting against lung injury, and its related conditions, in comparison to the groups receiving Compound I and Compound I/Dexamethasone.

Whole lung tissue samples were taken at end of study for histological examination. The histological examination comprised random selection of visual field areas which were blind scored for lung injury. The lung histopathology scoring was adapted in reference to previous methods (see: An J, et al. Int. J. Mol. Sci. 2017, 18, 1847; Meng P Z, et al. Med Sci Monit, 2018; 24:4869-4875]. Three scoring criteria were used to evaluate the lungs: 1) the scoring criteria of alveolar injury and inflammatory cell infiltration; 2) the score of bronchial and pulmonary arteriole injury; and 3) the total score of lung injury, bronchiole and pulmonary arteriole injury. 1) The scoring criteria of alveolar injury and inflammatory cell infiltration was: 0=no alveolar injury and inflammatory cell infiltration; 1=mild alveolar wall thickening with or without alveolar effusion or mild hemorrhage and inflammatory cell infiltration; 2=moderate alveolar wall thickening with alveolar effusion or moderate hemorrhage and inflammatory cell infiltration; 3=severe thickening of alveolar wall with exudate or severe hemorrhage and inflammatory cell infiltration. 2) The scoring of bronchial and pulmonary arteriole injury was: 0=no injury and inflammatory cell infiltration; 1=mild hyperplasia of bronchial epithelial cells and denudation of pulmonary arteriole endothelial cells with mild infiltration of inflammatory cells in the external model; 2=moderate hyperplasia of bronchial epithelial cells and denudation of pulmonary arteriole endothelial cells with diffuse infiltration of inflammatory cells in the external model; and 3=severe hyperplasia of bronchial epithelial cells, denudation of endothelial cells in pulmonary arterioles, infiltration of inflammatory cells in bronchial and arterial walls, and diffuse infiltration of inflammatory cells into the adventitia. The sum 3) of all scores was considered as the total score on pathology of lung tissues.

In line with previous study, groups receiving Compound I were generally found to have a positive impact on the observed pathology of the lung tissue.

As depicted in FIG. 5A, it was observed that Compound I at all doses (Group 4 (G4), Group 5 (G5)) had a significant positive effect in terms of decreasing the severity of injuries to alveolar tissue, in line with the positive control, dexamethasone (G3), and as compared to the lung tissue obtained and analyzed from untreated mice in the model group (G2). In terms of bronchial and arteriole injury, Compound I (G4, G5) also performed significantly better than the model (G2) and the positive group (G3) (see FIG. 5B). Unexpectedly, the groups (G6, G7) receiving both Compound I and dexamethasone, which was administered at a relatively low dosage, showed statistically significant improvements over both the model group (G2) as well as the individual drug treatment groups. Lower levels of alveolar injury as well as bronchial and arteriole injury was observed, already alone with treatment groups G4 and G5, corresponding to less congestion of capillaries and infiltration of inflammatory cells in the alveolar wall, that may result in uneven thickening of the alveolar wall. These results not only show the effectiveness of Compound I alone, but significantly demonstrate a synergy in the effect of administering Compound I together with dexamethasone for the treatment of acute lung injuries (e.g. bronchial and arteriole, and/or alveoli injury, and conditions associated therewith, such as bronchiolar epithelial hyperplasia, neutrophil dominated inflammatory cell infiltration in the bronchial wall outer membrane, or edema of pulmonary arteriole outer membrane). Dexamethasone may be useful as a treatment to control inflammation processes associated with respiratory infections but often also has side effects. Accordingly it may be contemplated to administered Compound I for the treatment of a lung injury or associated condition such as described herein, also to a subject receiving or treated dexamethasone, possibly allowing also for a reduction or a lower dosing or treatment period with dexamethasone. The observed effect is further represented in FIG. 5D, comparing lung pathology scoring of Group 2 (model) as compared to Group 3 (dexamethasone) and Group 6 (Compound I 1 mg/kg and dexamethasone 0.5 mg/kg).

Example 3—Pharmacokinetic study Compound I vs. Cyclosporin A (CsA)

A comparative pharmacokinetic study to observe tissue distribution of Compound 1, and CsA was performed. SD rats were injected respectively with a single dose iv (3 mg/kg) of CsA injection solution or a solution of Compound I. For each of the tested drugs, a total of 24 SD rats was used; 3 male and 3 female rats for each of the four time points of the study, i.e. 0.5 h, 2 h, 6 h, and 24 h after injection. At the respective time points, blood samples and respective organ/tissues were collected and processed according to standard procedures The concentration of the respective drugs in the respective tissues were then measured using a validated LC-Ms/Ms method.

| Tissue/Organ | $AUC_{last}$ (h * ng/g) | | $C_{max}$ (ng/g) | | $T_{max}$ (h) | |
|---|---|---|---|---|---|---|
| | CsA | Compound 1 | CsA | Compound 1 | CsA | Compound 1 |
| Adipose tissues | 68000 | 6310 | 3100 | 580 | 6 | 0.5 |
| Heart | 34100 | 40200 | 5210 | 5210 | 0.5 | 0.5 |
| Kidney | 78700 | 60600 | 10200 | 13200 | 0.5 | 0.5 |
| Liver | 105000 | 82600 | 13100 | 13600 | 0.5 | 0.5 |
| Lung | 50100 | 53700 | 6880 | 8000 | 0.5 | 0.5 |
| Spleen | 101000 | 126000 | 12000 | 11400 | 0.5 | 0.5 |
| Whole blood | 11300 | 7140 | 1640 | 1150 | 0.5 | 0.5 |

It was observed that the distribution of Compound 1 to various tissues or organs had notable differences, compared to the distribution of CsA despite Compound 1 having core structural similarities. CsA was found to distribute significantly to the adipose tissues, whereas Compound 1 was observed to distribute to a greater degree to organ tissues, such as the kidney, and the lung. The amount of Compound I (AUC) found in the lipid tissues compared to CsA was ca. 10-fold less. The maximum concentration ($C_{max}$) of Compound I observed in the lung and kidney was also unexpectedly significantly higher than that of CsA.

The invention claimed is:

1. A method for the prevention and/or treatment of an organ injury or a condition associated with an organ injury in a subject diagnosed with, or suffering from an infection, wherein the method comprises administering to said subject Compound I, or a pharmaceutically acceptable salt thereof

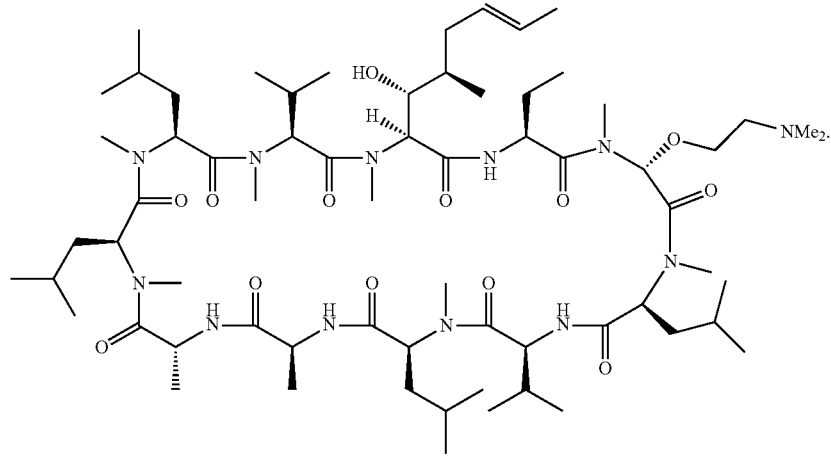

Compound 1

2. The method according to claim 1, wherein the organ injury or condition associated therewith is a consequence of the infection.

3. The method according to claim 1, wherein the infection is viral, bacterial, fungal, or parasitic.

4. The method according to claim 1, wherein the infection is a viral infection.

5. The method according to claim 1, wherein the organ is a lung.

6. The method according to claim 5, wherein the lung injury, or a condition associated with the lung injury is damage to the respiratory tissue, optionally any one or combination of bronchi, bronchioles, alveoli, or tissues associated therewith; alveolar damage; pulmonary infiltration; alveolar infiltration; dyspnea; pulmonary edema; pulmonary fibrosis; hypoxemia; pneumonia; bronchiolitis; or a combination thereof.

7. The method according to claim 5, wherein the lung injury or condition associated with the lung injury is acute hypoxic respiratory insufficiency or failure, acute lung injury (ALI) or acute respiratory distress syndrome (ARDS).

8. The method according to claim 5, wherein the method is utilized for preventing the development, or the progression of acute lung injury (ALI) or acute respiratory distress syndrome (ARDS) in a subject suffering from a respiratory infection.

9. The method according to claim 5, wherein the infection is a respiratory viral infection and optionally caused by a respiratory virus, optionally an influenza virus, a rhinovirus, a respiratory syncytial virus, an adenovirus, a coronavirus (CoV), a dengue virus, or a parainfluenza virus.

10. The method according to claim 9, wherein the viral respiratory infection is caused by a coronavirus, and optionally wherein the coronavirus is a SARS-CoV, SARS-COV2, or MERS-COV.

11. The method according to claim 10, wherein the respiratory infection is COVID-19.

12. The method according to claim 1, wherein the infection is a respiratory bacterial infection, and optionally is caused by a Gram-negative and/or a Gram-positive bacteria, further optionally wherein the bacteria is a *Pseudomonas* bacteria and optionally *Pseudomonas aeruginosa*, a *Klebsiella* bacteria and optionally a *Klebsiella pneumoniae*, a Haemophilius bacteria and optionally *Haemophilus influenzae*, a *Streptococcus* bacteria and optionally a *Streptococcus pneumoniae*, a *Staphylococcus* bacteria and optionally a *Staphylococcus aureus*, or a *Legionella* bacteria and optionally *Legionella pneumophila*.

13. The method according to claim 1, wherein Compound I or a pharmaceutically acceptable salt thereof is administered to a subject in need thereof before, simultaneously with, and/or after a treatment with oxygen support or mechanical ventilation.

14. The method according to claim 1, wherein the subject is receiving a second active ingredient, optionally corticosteroid, and further optionally a dexamethasone.

15. The method according to claim 14 wherein the subject is diagnosed with, or suffering from a respiratory infection, and optionally, wherein the method is utilized for preventing the development, or progression of acute lung injury (ALI) or acute respiratory distress syndrome (ARDS).

16. The method according to claim 14, wherein Compound I is administered sequentially or simultaneously with the second active ingredient.

17. The method according to claim 1, wherein the organ is a kidney.

18. The method according to claim 1, wherein Compound I or a pharmaceutically acceptable salt thereof is administered or is adapted for administration to a human subject.

19. The method according to claim 1, wherein the Compound I or a pharmaceutically acceptable salt thereof is administered by injection or infusion, inhalation, or by oral administration.

20. The method according to claim 1, wherein at least one unit dose of Compound I or a pharmaceutically acceptable salt thereof is administered to the subject, and wherein the unit dose is between about 0.005 to 20 mg/kg.

* * * * *